US012522453B2

(12) United States Patent
Wagner et al.

(10) Patent No.: US 12,522,453 B2
(45) Date of Patent: Jan. 13, 2026

(54) EMPTYING SYSTEM FOR EMPTYING PASTE-LIKE MATERIAL FROM BARREL-TYPE CONTAINERS

(71) Applicant: Netzsch Pumpen & Systeme GmbH, Waldkraiburg (DE)

(72) Inventors: Stefan Wagner, Heldenstein (DE); Egon Grainer, Heldenstein (DE); Stefan Schöberl, Buchbach (DE); Stephan Untergehrer, Velden/Vils (DE)

(73) Assignee: Netzsch Pumpen & Systeme GmbH (DE), Waldkraiburg (DE)

( * ) Notice: Subject to any disclaimer, the term of this patent is extended or adjusted under 35 U.S.C. 154(b) by 115 days.

(21) Appl. No.: 18/442,950

(22) Filed: Feb. 15, 2024

(65) Prior Publication Data
US 2024/0279007 A1 Aug. 22, 2024

(30) Foreign Application Priority Data

Feb. 20, 2023 (DE) ..................... 10 2023 104 133.9
Mar. 7, 2023 (DE) ..................... 10 2023 105 661.1

(51) Int. Cl.
*B65G 65/36* (2006.01)
*B65G 65/38* (2006.01)

(52) U.S. Cl.
CPC ...... *B65G 65/38* (2013.01); *B65G 2201/0241* (2013.01)

(58) Field of Classification Search
CPC ...... B65G 65/36; B65G 65/365; B65G 65/38; B67D 7/645; B67D 7/725

USPC .......................................................... 414/317
See application file for complete search history.

(56) References Cited

U.S. PATENT DOCUMENTS

| | | | | |
|---|---|---|---|---|
| 3,368,703 A | * | 2/1968 | Lusk .................... | A01F 25/2009 414/302 |
| 3,429,619 A | * | 2/1969 | Weibull ................ | B65G 65/38 406/60 |
| 3,513,995 A | * | 5/1970 | Stroker ................ | B65G 65/365 414/302 |
| 3,601,285 A | * | 8/1971 | Leger ....................... | B67D 7/62 222/66 |
| 4,487,542 A | * | 12/1984 | Johanning ............ | B65G 65/365 414/292 |
| 4,564,317 A | * | 1/1986 | Farber .................. | B65G 65/365 406/56 |
| 4,721,425 A | * | 1/1988 | Strocker ............... | B65G 65/32 414/300 |

(Continued)

FOREIGN PATENT DOCUMENTS

EP 1897849 A1 * 3/2008 ............. B67D 7/645

*Primary Examiner* — Joseph A Dillon, Jr.
(74) *Attorney, Agent, or Firm* — Whitmyer IP Group LLC (57) ABSTRACT

An emptying system for emptying paste-like material from barrel-type containers having a container follower plate—which preferably can be lowered like a plunger into the interior of the container—and which includes a removal opening having a pump in operative connection with the removal opening for extracting material enclosed in the collection chamber between the container bottom and the container follower plate, wherein in the collection chamber at least one agitator is provided, which imposes on the material contained in the collection chamber a motion in relation to the container follower plate.

20 Claims, 11 Drawing Sheets

(56) References Cited

U.S. PATENT DOCUMENTS

| | | | |
|---|---|---|---|
| 4,730,647 A * | 3/1988 | Mulder | B05B 14/48 118/308 |
| 4,815,925 A * | 3/1989 | Buddenberg | B65G 65/365 414/302 |
| 5,944,455 A * | 8/1999 | Wilhelm | B65G 53/42 406/141 |
| 6,036,408 A * | 3/2000 | Wilhelm | B65G 53/24 406/134 |
| 6,302,304 B1 * | 10/2001 | Spencer | B05B 15/30 222/321.9 |
| 6,979,166 B2 * | 12/2005 | Ours | B65B 69/0075 406/114 |
| 8,322,951 B2 * | 12/2012 | Kvalheim | B65G 53/40 406/114 |
| 9,126,773 B2 * | 9/2015 | Hino | B65G 53/24 |
| 9,663,263 B2 * | 5/2017 | Moretto | B65B 69/0075 |
| 10,239,681 B2 * | 3/2019 | Thompson | F15B 13/042 |
| 11,192,774 B2 * | 12/2021 | Tartler | B67D 7/645 |
| 11,791,028 B2 * | 10/2023 | Akdogan | B25J 9/1697 414/217 |
| 12,367,957 B2 * | 7/2025 | Akdogan | B65B 57/14 |
| 12,454,100 B2 * | 10/2025 | Charlebois | B29C 64/307 |
| 2006/0249535 A1 * | 11/2006 | Mauger | B67D 7/0227 222/95 |
| 2008/0023082 A1 * | 1/2008 | Schucker | B05C 11/10 137/565.17 |
| 2010/0129252 A1 * | 5/2010 | Takase | F04C 2/1073 418/48 |
| 2012/0163927 A1 * | 6/2012 | Kaminsky | B65G 65/36 406/135 |
| 2014/0124090 A1 * | 5/2014 | Schneider | B65D 83/767 141/27 |
| 2015/0375185 A1 * | 12/2015 | Waizenauer | B01F 23/40 366/151.1 |
| 2016/0368719 A1 * | 12/2016 | Hecht | B65G 69/181 |
| 2022/0315324 A1 * | 10/2022 | Zhang | B65D 88/745 |
| 2024/0101364 A1 * | 3/2024 | Renyer | B65G 33/14 |
| 2025/0074724 A1 * | 3/2025 | Schwaiger | B65G 69/181 |

* cited by examiner

EMPTYING SYSTEM FOR EMPTYING PASTE-LIKE MATERIAL FROM BARREL-TYPE CONTAINERS

TECHNICAL FIELD

The invention relates to an emptying system for emptying paste-like material from preferably barrel-type containers, as well as a method for emptying paste-like material from barrel-type containers.

BACKGROUND

The use of conventional emptying systems for paste-like material makes it possible to empty materials already in viscous form from containers, preferably barrel-type containers. For the most part, this occurs by means of a pump and a container follower plate. Accordingly, the container follower plate, which comprises a removal opening, is pressed downward—in the direction of the material—while the pump at the same time draws the material out of the container through the removal opening. With more highly viscous materials, the material is generally pre-heated to reduce viscosity and to increase the fluidity of the material.

With a few materials, however, even the heating of the material in combination with the pumping action is no longer sufficient to move the highly viscous material out of the container. In this case, the material is not fluid, or not sufficiently fluid, and thus actually fails to move to the removal opening.

SUMMARY

Accordingly, it is the object of the invention to provide a means whereby highly viscous materials, preferably even those that are not able to be moved out of a container by applying the prior art, can be advanced out of a container.

This object is fulfilled by means of an emptying system as described herein.

For this purpose, an outlet system is proposed for emptying paste-like material from preferably barrel-type containers by means of a barrel follower plate that can be lowered like a plunger into the interior of the container. Preferably, the container follower plate itself can be moved and inserted into the interior of the container. Alternatively, however, the base of the container can be guided in the direction toward the still-stationary container follower plate, so that "only" a corresponding relative motion occurs—which can suffice even if it is not preferable. Thus the container—in particular when so-called "clay," that is, the modeling compound, is to be controlled in prototype or bodywork prototype construction—can stand on its base, hang overhead with the container opening hanging downward (preferable) or lie on its side, although the latter is not preferable. At the same time, the container follower plate comprises a preferably centrally placed removal opening and, in the first case mentioned, is configured and movably installed in such a way that it can be inserted in the vertical direction into a barrel-type container, from above downward in the direction of its longitudinal axis.

In addition, the emptying system comprises a pump for extracting the material enclosed in the collection chamber between the container base and the container follower plate, so that the pump is in an operative connection with the removal opening and preferably draws the material out of the collection chamber through the removal opening.

The emptying system is distinguished in that the collection chamber includes at least one agitator, which sets the material enclosed in the collection chamber into motion with respect to the container follower plate.

The material treated by the agitator in this case is ideally so highly viscous that it is impossible to extract in its non-decomposed heated condition by pumping alone. The agitator is ideally configured in such a way that the material intended to be treated and pumped out by it receives a forceful movement that causes at least a temporary reduction of the viscosity of the material.

The agitator has the effect that the material or preferably parts of the material are moved in relation to the container follower plate. Because of this relative motion, the viscosity of the material or at least of parts of the material is reduced, preferably by a shearing effect or because fragments from the surface area of the material are loosened in the collection chamber and/or are severed from the rest of the material, at least essentially. Consequently, the material or at least parts of the material are drawn off by the pump, in this case through the container follower plate, mostly upward into a region above the container follower plate.

Barrel-type containers as described here are containers that comprise a closed base and, as a rule, a self-supporting lateral boundary as well as a removal opening opposite the base, which as a rule is not, or essentially is not, drawn in but rather empties the container interior completely. The self-supporting characteristic, in any case, is so pronounced that the lateral boundary does not collapse under the influence of the frictional forces conveyed to it by the container follower plate upon descending into the barrel-type container. The term "barrel-type container" in its broader sense is not restricted to barrels in the actual sense but instead can include square-shaped tanks or any other type of storage containers in which the material that is to be pumped remains completely or essentially unmoved until it is drawn in by the pump. The term also has a preferred, narrower definition in the sense that a barrel-type container is shaped in such a way that it shows everywhere, or for the most part, a series of essentially round cross-sections if it is cut at various heights perpendicular to its longitudinal or rotational axis.

In quite a few rare cases, the container follower plate is not directly contiguous with the lateral boundary of the barrel-type container itself but rather with a sack or pouch that covers it and which is to be emptied, whose upper end then is secured sufficiently firmly to the barrel-type container, so that it succeeds in stripping the sack or pouch on the inside and thus manages to empty it. In such a case the agitator(s) must maintain sufficient radial distance from the sack or pouch in order to avoid gripping it.

In several preferred cases it happens that the container follower plate constantly keeps the material to be pumped under a certain tension or a certain pressure by means of its continuous additional submersion in the barrel-type container, and thereby assists the material to move through the removal opening of the container follower plate to the pump intake area.

The precise physical effect on which the invention is based has not yet been conclusively investigated. But in an initial approximation it could be describes as follows:

The strongly preferred effect of the invention is the fact that the inventive agitation is conducted with the necessary means in such a way that the material that is to be pumped is subjected to a forced shearing rate that is more than inconsequential, in the intake/suctioning or entry area of the pump (ideally only there). The shearing rate is of sufficient strength that the material there undergoes a shearing/thinning process and thus a more than negligible reduction in the local viscosity is achieved. In an initial approximation, it could be said that, by means of the shearing, the internal cohesion of the material to be pumped is reduced—in materials consisting of long-chained molecules, for example, because molecular entanglements are drawn apart. The effect appears to be especially pronounced where non-Newtonian fluids are to be pumped, so that the invention is especially applicable for converting those into pumpable condition.

It can be said in many cases that the inventive agitator is preferably configured in such a way that it only places in motion the area of the highest level or the surface region of the mass or material to be moved, and does so preferably in a fundamentally sliding or shearing motion.

In one preferred embodiment of the emptying system, the agitator is at least one shearing strip—extending preferably in an essentially radial direction to the center longitudinal axis of the container to be emptied—and is fastened to the surface of the container follower plate facing the collection chamber and extending from there into the collection chamber. By means of this shearing strip, parts of the material from the surface area of the material can be sheared and/or fragmented in the collection chamber. In addition, the shearing strip advances the material that has been fragmented and/or sheared in this way, by means of the relative motion of the removal opening, and thus further facilitates the removal of the material.

In addition, it is particularly preferable if the container follower plate is blocked from rotating and if the emptying system comprises a rotatably powerable container carrier. This constitutes a simple means of producing the relative motion between the container follower plate, preferably with shearing strips firmly attached to it, or shearing strips and material in the collection chamber.

It is particularly preferred, moreover, that the agitator should be at least one shearing strip—preferably extending essentially radially to the center longitudinal axis of the container that is to be emptied—and which is held, rotating together, on an operative extension of the pump rotor, which extends through the container follower plate, preferably through its removal opening, into the collection chamber, wherein the container that is to be emptied is preferably kept non-rotatable. This constitutes an additional simple means of ensuring the relative motion between material and container follower plate, in that the rotating motion of the pump rotor, which is necessary in any case, is used in order to ensure a rotating motion of the at least one shearing strip.

In an additional preferred embodiment, the aforementioned operative extension is connected with the pump rotor by a gear unit so that it rotates at a modified speed with respect to the pump rotor. A planetary gear or similarly operating gear unit is preferably employed for this purpose.

In addition, it is particularly preferable if the at least one shearing strip bears a crenellated crown on the surface directly facing the container base. Preferably, this crenellated crown comprises crenellations extending in the direction of the container longitudinal axis more deeply into the collection chamber, and openings between them. Thus the crenellated crown divides and/or tears the material to be emptied, at least in part, and thereby reduces the material's viscosity.

It is particularly preferable, moreover, that several shearing strips should be provided with crenellated crown, and the crenellations of the shearing strips following in the direction of rotation should assume a more significant radial position than the crenellations of the preceding shearing strip. In the choice of this arrangement, the following crenellations thus do not move in the rotary motion of the shearing strips in the same paths that the foregoing crenellations have traced, and thus they would no longer, or essentially no longer, draw the material.

In addition, it is particularly preferable if the leading side of the at least one shearing strip in the rotating direction is arched in concave manner. This shape improves the gathering and concentration of the mass to be emptied and, with the rotary motion of the shearing strip, guides the material toward the removal opening, which is preferably situated centrally in the container follower plate; that is, it results in a weighting of the material in the radially inward direction.

It is particularly preferable, moreover, for the end of the at least one shearing strip extends to the immediate proximity of the removal opening—preferably even overlapping with its slight cross-section—and ideally runs off approximately or essentially tangentially to the outline of the removal opening. Material to be emptied, which is accumulated by the shearing strip, is thus directed with particular efficiency toward the removal opening and passed onward to the pumping suction.

Another preferred embodiment foresees that the container follower plate is either completely or primarily cone-shaped on its side facing the collection chamber, so that the radial outer edges of the container follower plate advance quickly toward its removal opening upon sinking into the container, preferably at a cone angle between less than or approximately 1° and a maximum of 10°, or better no more than 5°.

It is particularly preferred, moreover, that the container follower plate bears on its periphery a flat seal, preferably one that forms a lip seal, which is arched counter to the sinking direction as it sinks. The following relationship—based on the longitudinal axis of the container to be emptied, which constitutes the axial direction—applies for its radial width B and axial thickness D: $B<2\times D$.

Additional possible configurations, ways of operation and advantages are to be found in the description of the exemplary embodiment and/or by referring to the drawings.

DETAILED DESCRIPTION

The starting point for the invention, as described above, is a series of highly viscous, not fluid and in this condition nonpumpable materials (e.g., clay, modeling compound) in a barrel-like container 2. The material can be present in the container 2 in several different forms. Thus, the container 2, for example, can be filled entirely, the material can be found in the container 2 in an extreme case as bar material, as well as in the form of chunks or particles, and in some cases even of shavings.

Figure 1:
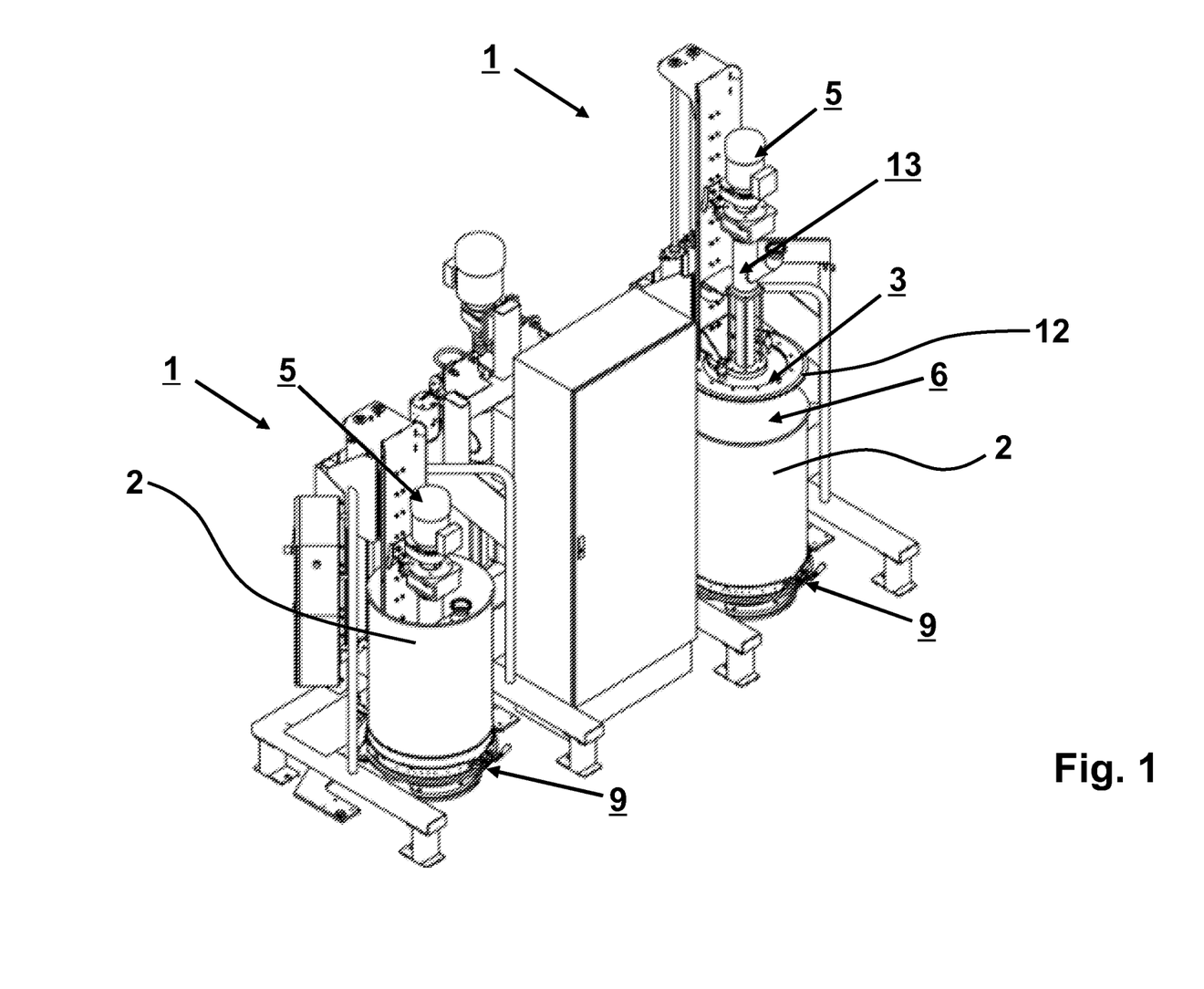
FIG. 1 shows an installation with two emptying systems drivable in parallel, in a three-dimensional view.
Figure 2:
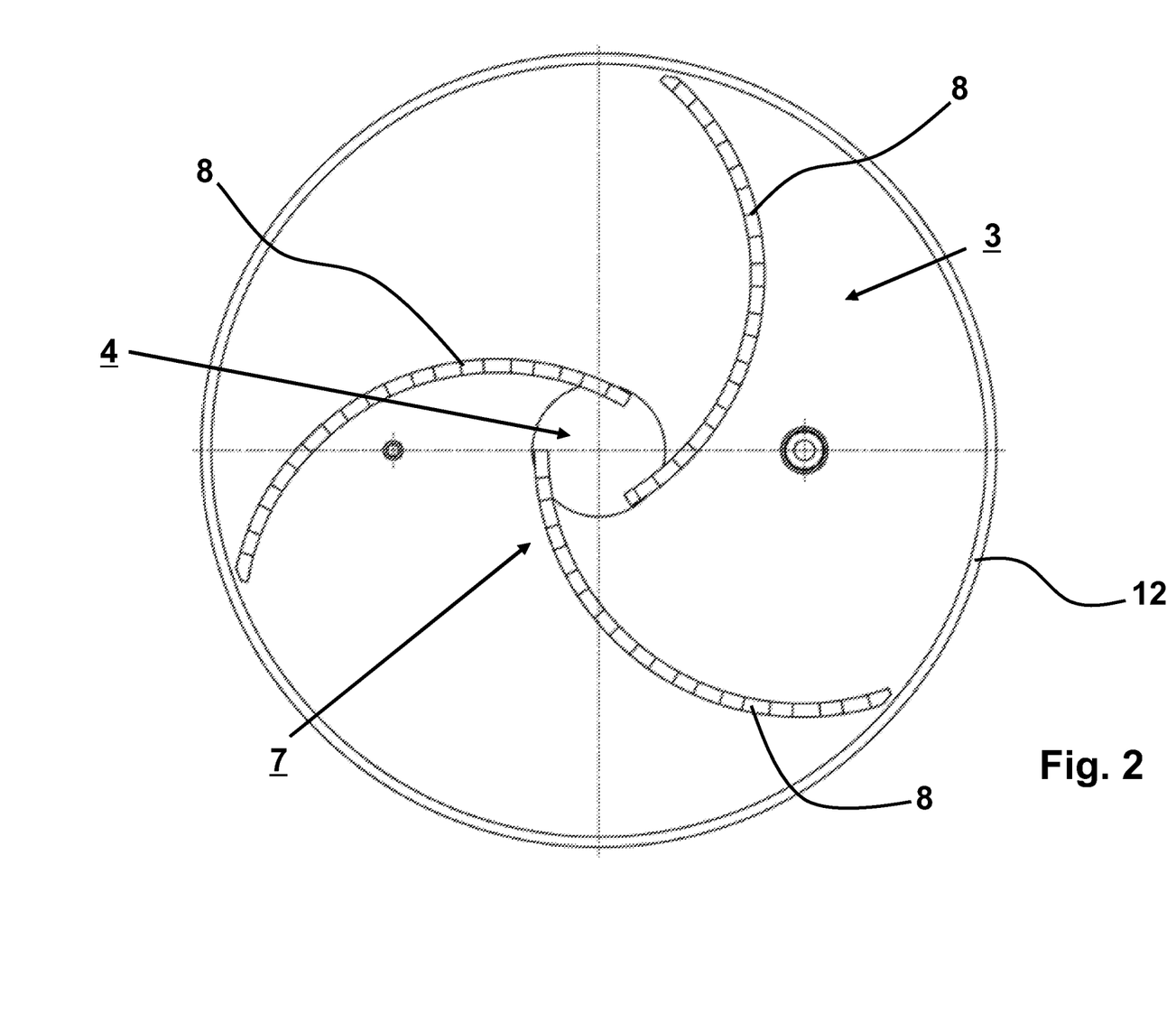
FIG. 2 shows a container follower plate with shearing strips in the lower area.
Figure 3:
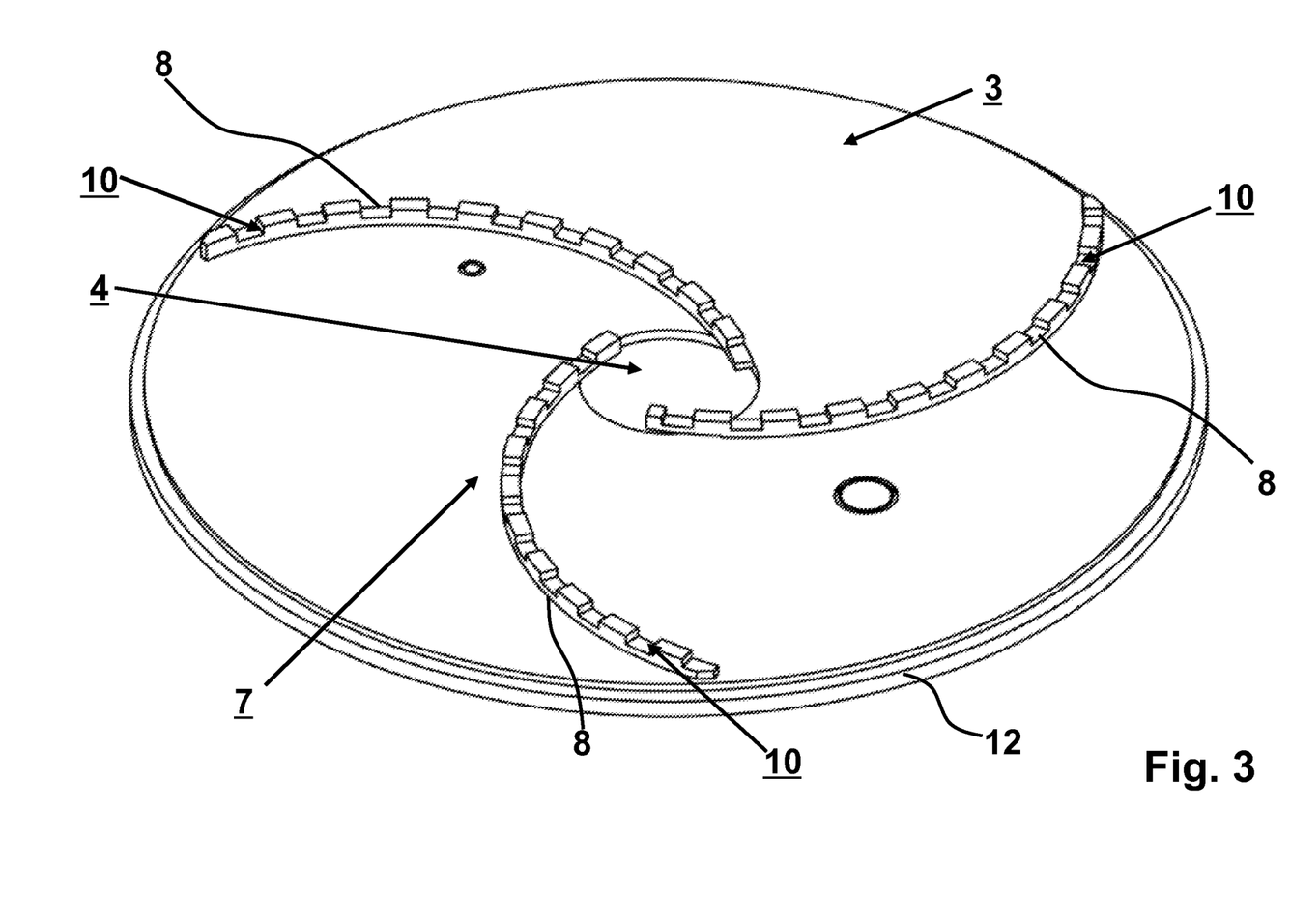
FIG. 3 shows a container follower plate with shearing strips in a three-dimensional depiction from below.
Figure 4:
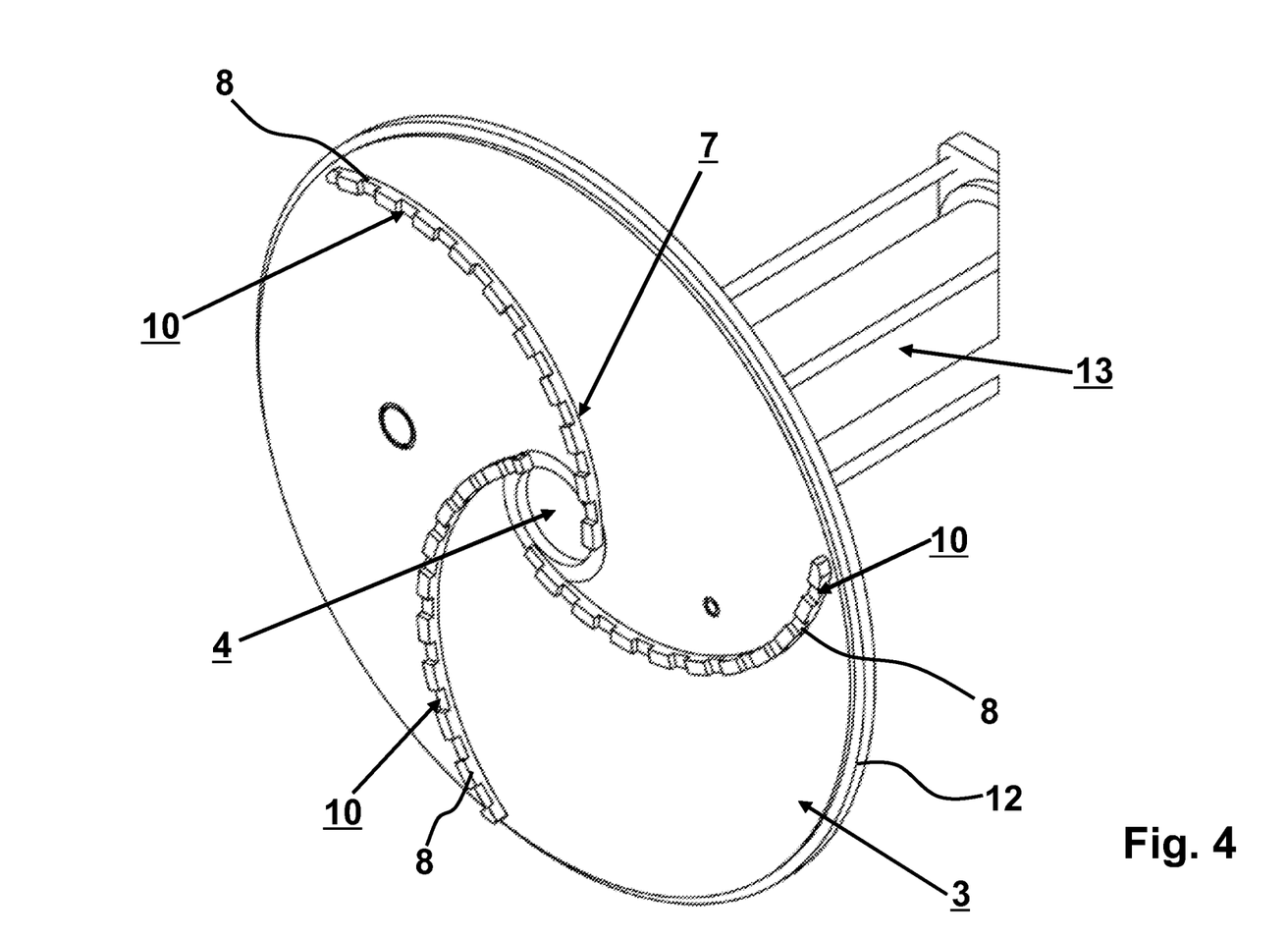
FIG. 4 shows a container follower plate with shearing strips in a three-dimensional depiction from below, wherein the container follower plate is fastened to a hollow column of a pump—wherein the hollow column is preferably the stator of the eccentric screw pump.
Figure 5:
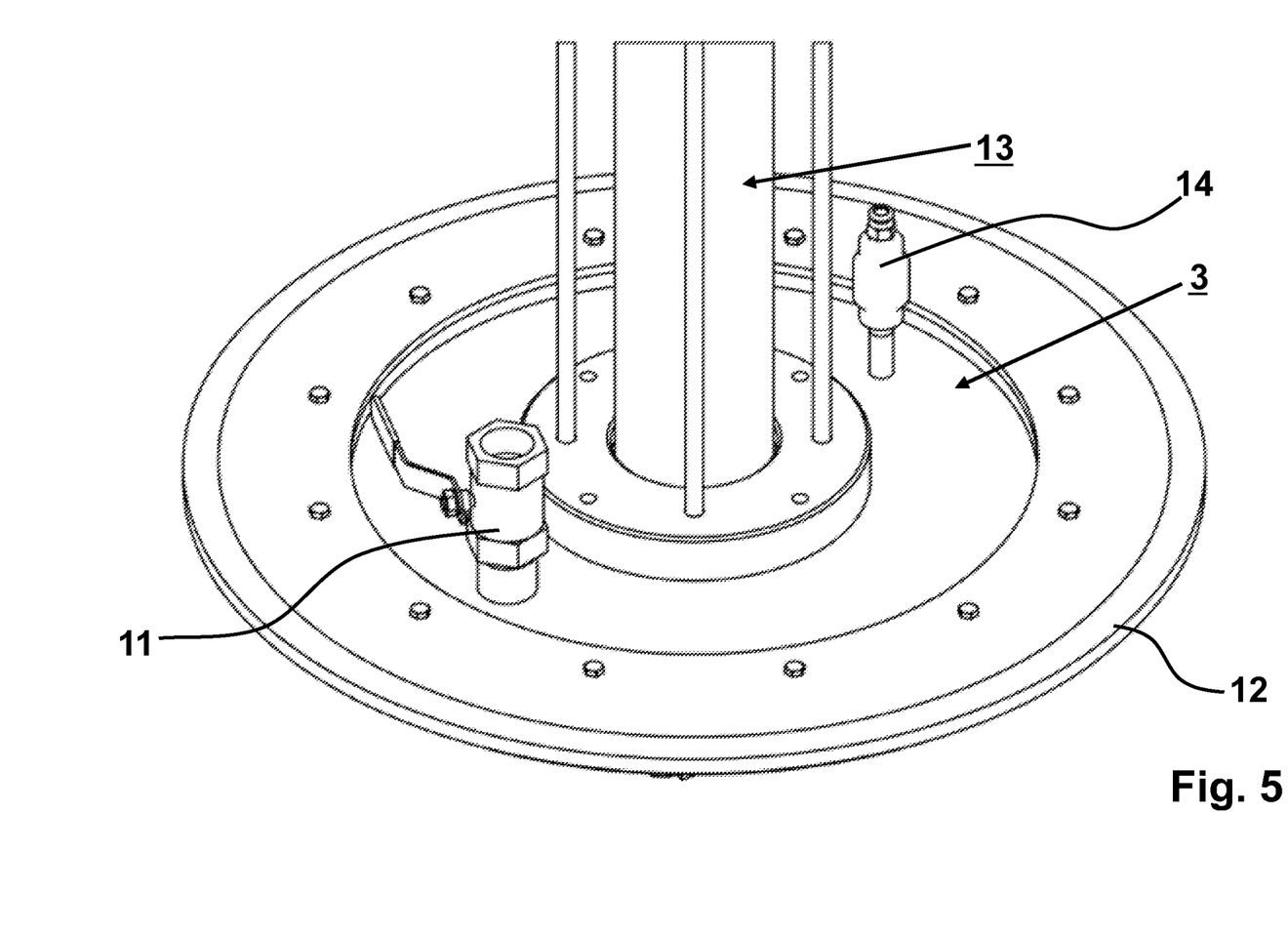
FIG. 5 shows a container follower plate in a three-dimensional depiction from above, wherein the container follower plate is fastened to a hollow column of a pump.
Figure 9:
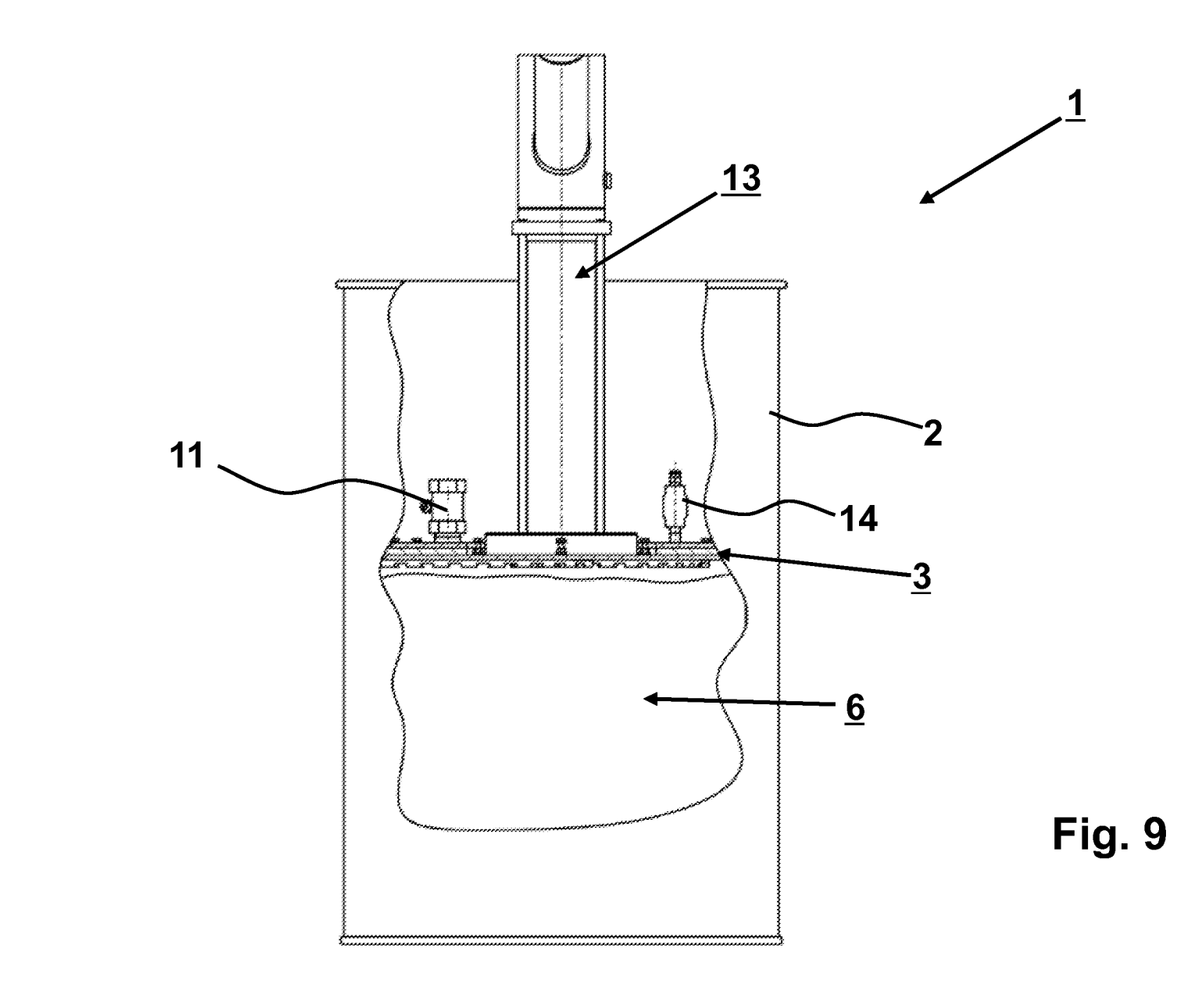
FIG. 9 shows an emptying system with lowered container follower plate in partially cut-out frontal view.

First, FIG. 1 shows an installation with two emptying systems 1 operated in parallel, each comprising a pump with raisable and lowerable hollow column 13, which preferably also equally constitutes the stator housing of the eccentric screw pump or leads directly into it The motor 5 of the pump used in this embodiment, which is preferably flange-mounted on the highest end of the hollow column, can be seen in FIG. 1—while the eccentric screw, which generates the actual pump effect in the present case, is situated inside the hollow column 13 and thus is not visible from outside. Consequently this hollow column 13 is fastened to a container follower plate 3, preferably in such a way that it encloses the preferably central removal opening 4 of the container follower plate 3 on one side. The container follower plate 3, in addition, preferably encloses a flat seal 12, which is situated on the outer radius of the container follower plate 3 and, with the lowering and raising process of the container follower plate 3, glides along on the container inside wall. If, by means of the raising and lowering mechanism of the hollow column 13, the container follower plate 3 is pressed downward onto the material, a collection chamber 6 is formed in the container 2 between the container follower plate 3 and the container base, so that the material to be emptied is located in this collection chamber 6. The container follower plate 3 also preferably includes an agitator 7, which will be described in greater detail hereinafter. This described preferred embodiment of an emptying system 1 can also be recognized in FIG. 9, whereas here the collection chamber 6 between the container follower plate 3 and the container base is depicted better by the section view.

Figure 6:
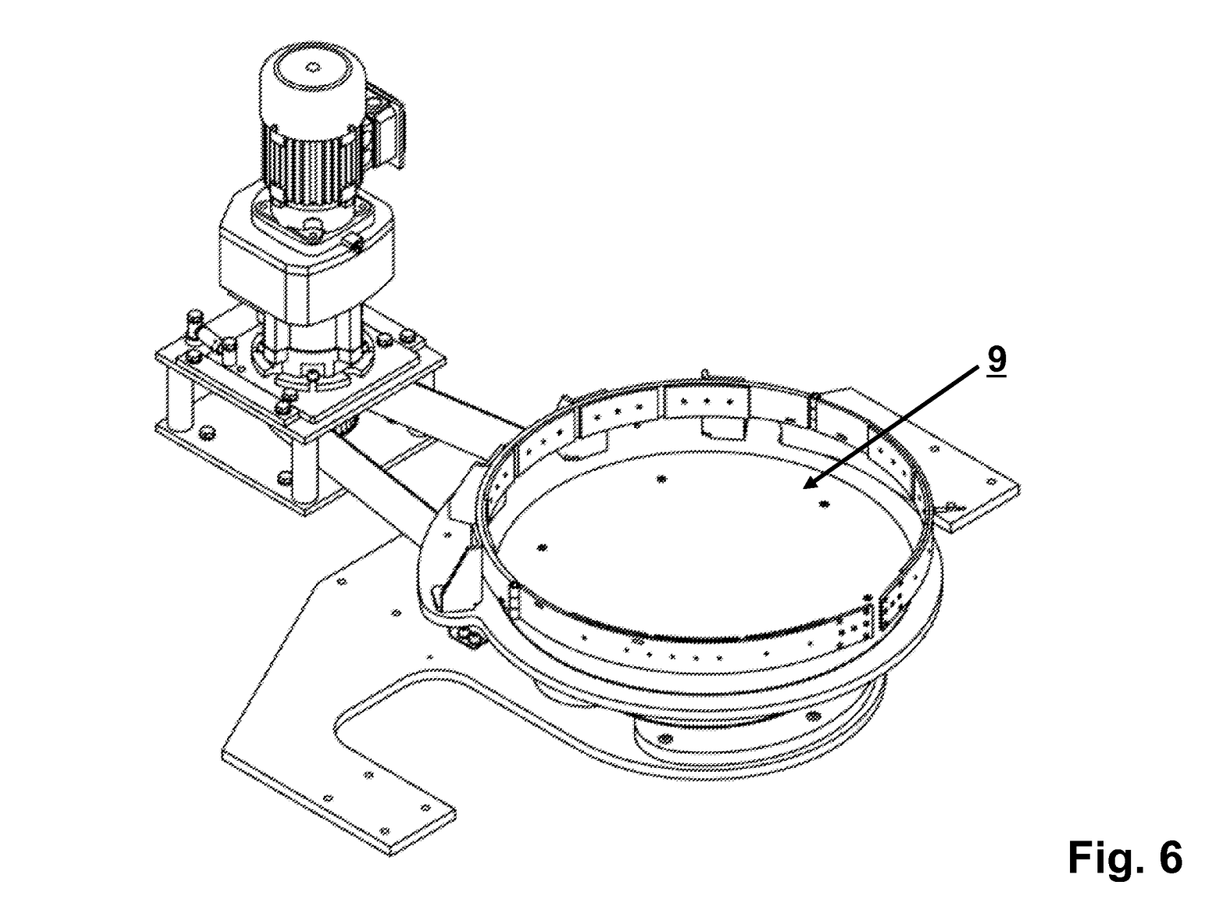
FIG. 6 shows the rotatably powered container carrier of the emptying system in a three-dimensional depiction.

The container 2 is preferably mounted on a container carrier 9, which is rotatably powered (see also FIG. 6). This occurs preferably by means of a motor, a belt and a belt disk, which in turn powers the device on which the container 2 stands. Alternatively but not preferably, a chain or ribbon wheel drive is also possibly, as well as possibly a gear drive. Thus the container 2 preferably rotates during the emptying process in order to ensure a relative motion between stationary container follower plate 3 and material in the container 2.

It should also be mentioned that this rotational motion or relative motion can also be achieved in other ways. Thus, for example, it is possible that the container 2 remains immobile while only the agitator 7 rotates. This could occur since the agitator 7 is firmly connected with the container follower plate 3. The said container follower plate 3 would then be rotated by a corresponding rotational device and thus generate the relative speed between material and agitator 7. This however may involve additional cost.

With respect to one clearly preferred embodiment, it is true that the agitator 7 is not connected with the container follower plate 3 and the container follower plate 3 is not rotatable. Because of the technical properties of the employed pump 5, it is possible with this variant to place the agitator 7 in direct contact with the pump rotor. Thus, on the container side, an additional rotating device is not strictly necessary, because the rotation motion of the agitator 7 can be supplied directly by the rotational motion of the pump rotor, preferably to the rotor of an eccentric screw shaft—regardless of the possibility of accumulated rotational motions of the barrel-like container and of the agitator.

A first preferred version of the agitator 7 can be recognized in FIGS. 2 through 5. The agitator 7 here consists preferably of at least two, preferably even at least three, shearing strips 8, which each (or nearly each) in turn bears a crenellated crown 10. In the illustrated preferred embodiment, the shearing strips 8 are firmly connected with the container follower plate 3.

From diverse test sequences, it was discovered that the viscosity of the material decreases by shearing, which the shearing strips 8 ensure in combination with the aforementioned relative motion. The crenellated crowns 10 here are staggered in their arrangement so that shearing forces are continuously introduced into the material, as long as the container follower plate 3 is contiguous with the material. The combination of the rotational motion and the specially arranged shearing strips 8 produces a very strong shearing effect in the material, so that the viscosity is further reduced. In addition, the said shearing strips 8 are arranged in such a way that they also simultaneously move the material in the direction of the suction opening of the pump or of the removal opening 4.

Thus it is possible to convey extremely highly viscous materials out of a container 2. To achieve a further optimization, attention should be paid to making a particularly favorable adjustment of the proportion between pump speed and the relative speed between material and container follower plate 3 by the agitator 7. The optimal speed both of the pump 5 and of the rotating unit depends on the configuration of the shearing strips 8, the feed rate, the pump size/design or the amount of material to be removed. In many cases it will be useful to provide a possibility for individual rotation speed adjustment by the user so that said user can adjust speed in such a way that the stream of material being pumped out subject to his observation is as great as possible.

In general, the container follower plate 3 is preferably configured as a round plate with an opening in the center, the so-called removal opening 4. This removal opening 4 functions as a suction opening, onto which the suction device of the pump 5 is applied, ideally in the center of the plate, in order to keep the pathways of the material from all directions to the suction opening as small as possible.

The flat seal 12 on the container follower plate 3 serves as insulation between the container follower plate 3 and the container 2. Preferably with this embodiment, the width of the flat seal 12 is kept as small as possible (width<2× thickness of the flat seal 12) so that this flat seal 12 cannot be turned over and the material is pressed past on the side.

To ensure the functioning of the shearing, at least one shearing strip 8 must be reconfigured as an agitator 7. But a number of at least two or three shearing strips is preferable.

However, inclusion of more than six or at least more than eight shearing strips 8 has no appreciable further improvement effect as a rule and should be reduced.

The shearing strips 8, as mentioned, preferably each bear one crenellated crown 10 with crenellations that preferably configure a mountain-valley combination. The "mountain" has a total height hges from the container follower plate 3 to the highest point of the mountain. The "valley" has the height of h1 from the valley to the container follower plate 3. The height h2 then describes the difference between mountain and valley.

The shearing strips can thus be divided into two regions. The height h1 is fully consistent over the entire radius of the container follower plate 3 and thus is the hydraulic surface that is always fully affected by the rotation motion and serves as guide or as conducting surface in order to advance the material in the direction toward the center of the suction opening. The height h1 should equal at least 0.05% of the diameter of the container follower plate 3. The maximum height is theoretically unlimited, but from a practical viewpoint is meaningless beyond a height of 5% of the container follower plate diameter. As soon as the shearing strips become too high, it is technically still possible but the forces and rotational momentum that must be applied in order to move these large shearing strips 8 through the material become extremely great and non-economical.

The height h2, on the other hand—in the preferred case illustrated here—is not consistent over the entire radius and always has a mountain and a valley portion. Here the mountain area is engaged in the material and in the next layer generates the necessary shearing to reduce the viscosity and to obtain fluidity. As soon as the material is rendered flowable over this region, it is then moved through the guidance region h1 to the suction opening. The height h2 should preferably correspond essentially to the height h1. The configuration of mountains and valleys is variable. Thus the jagged structure of the crenellated crown 10 shown in the drawings is preferred, although other structures, such as wave contours, are also possible.

The shearing strips 8 of the first illustrated preferred embodiment are preferably not identical or symmetrical. The mountains or valleys are always arranged unevenly. Viewed in the direction from radially inward toward radially outside, the one shearing strip 8 starts with a mountain and the other shearing strip 8 with a valley. This continues radially outward. Thus the one shearing strip 8 has a valley at the outside and the other has a mountain. Thus, owing to the rotating motion, a mountain always follows a valley and a valley follows a mountain and a shearing effect is produced by force.

The shearing strips 8 of the first preferred embodiment, in addition, preferably comprise a radius. The radius of the shearing strips 8 here is preferably ¼ of the diameter of the container follower plate 3. In addition, the rotating direction and the curvature of the shearing strips 8 are preferably adapted to one another in such a way that by means of the rotating motion the material is moved inward, to reach the centerpoint of the container follower plate 3.

Figure 7:
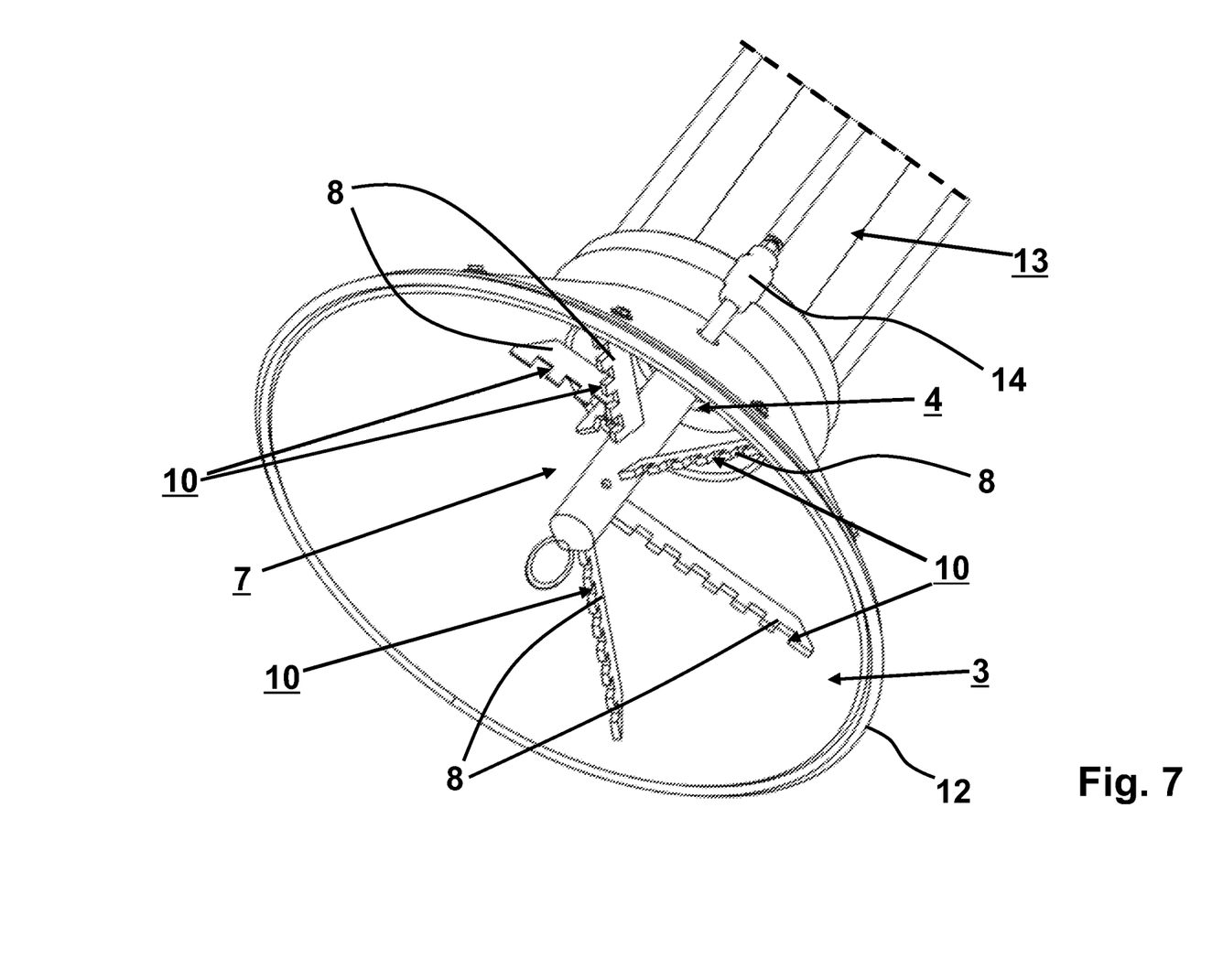
FIG. 7 shows a second embodiment of a container follower plate with shearing strips in three-dimensional depiction from below, wherein the container follower plate is fastened to a hollow column of a pump. It is important to note here that shearing strips are possible in fully different numbers, designs, contours and lengths, differing from the preferred embodiments illustrated in this exemplary model.
Figure 8:
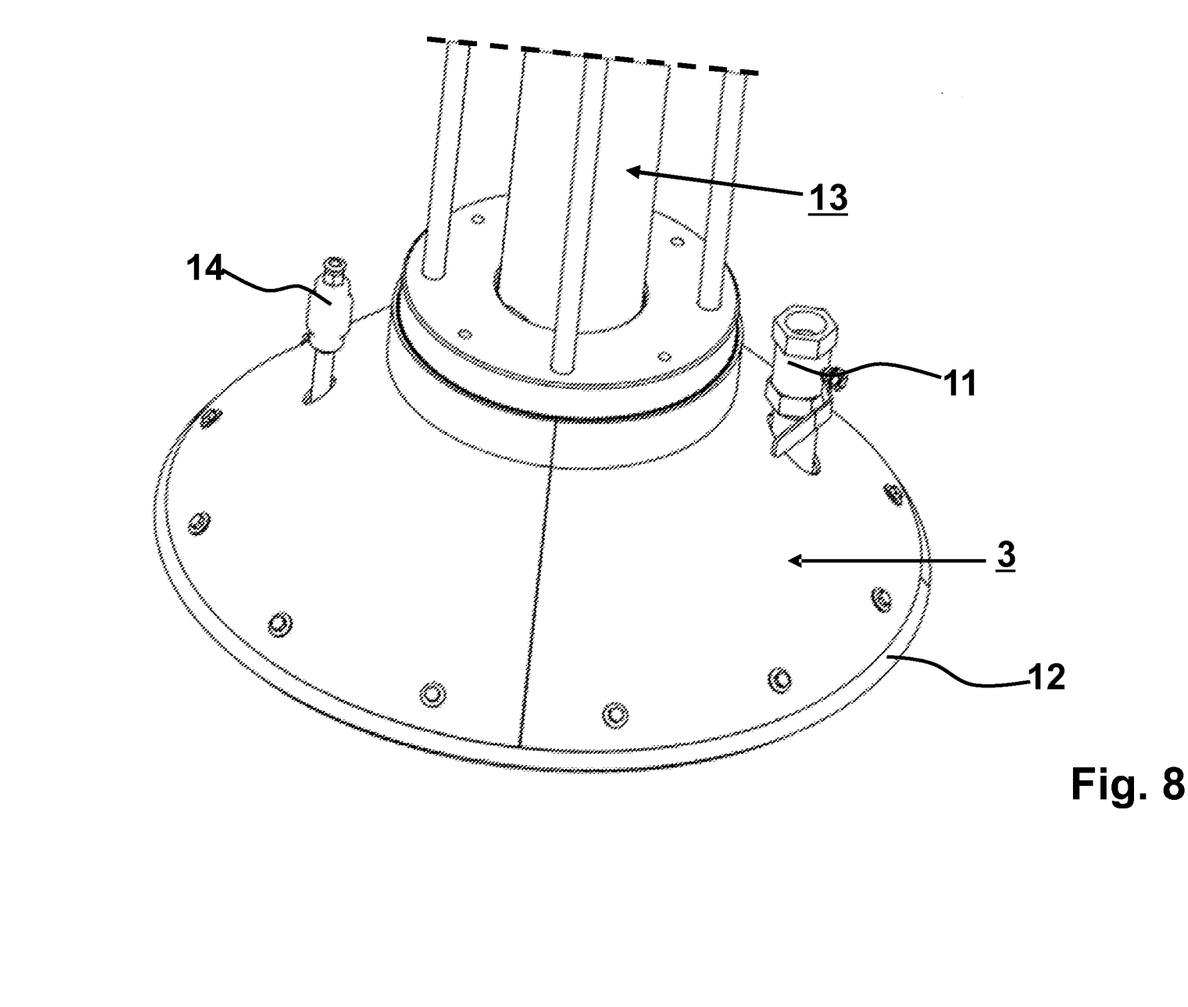
FIG. 8 shows the second exemplary model of a container follower plate from FIG. 7 in three-dimensional view from above.

Because of the tapered configuration of the container follower plate 3 (similar to a cone, as can be seen in FIGS. 7 and 8), the downward pressing of the container follower plate 3 would contribute still further to moving the material into the center of the suction opening of the pump or to the removal opening 4. The agitator 7 in turn consists of shearing strips 8 with crenellated crown 10, so that as a result at least four shearing strips are preferably employed.

The container follower plate 3, in addition, comprises preferably at least exhaust valve 11 and at least one compressed air supply 14.

The exhaust valve 11 is opened when the container follower plate is lowered into the container interior or otherwise is to be brought as if by relative motion to the container base in position, and must not include any air cushion between itself and the mass that is to be moved forward or removed. The compressed air supply 14 has another characteristic. It can cause compressed air to be emitted selectively (with the exhaust valve 11 simultaneously closed) in order to press the container follower plate 3 and the container base further apart from one another when the container 2 is emptied and anew container 2 is to be employed.

In general, the emptying system 1 is, in addition, is equipped with a heating device, which above all warms the material further in the collection chamber 6. Ideally, the entire emptying system 1 is not internally heated—even at selected spots—but instead is placed inside a housing to allow the emptying system 1 as a whole to be tempered, ideally up to a temperature approaching or equal to 60° C.

Figure 10:
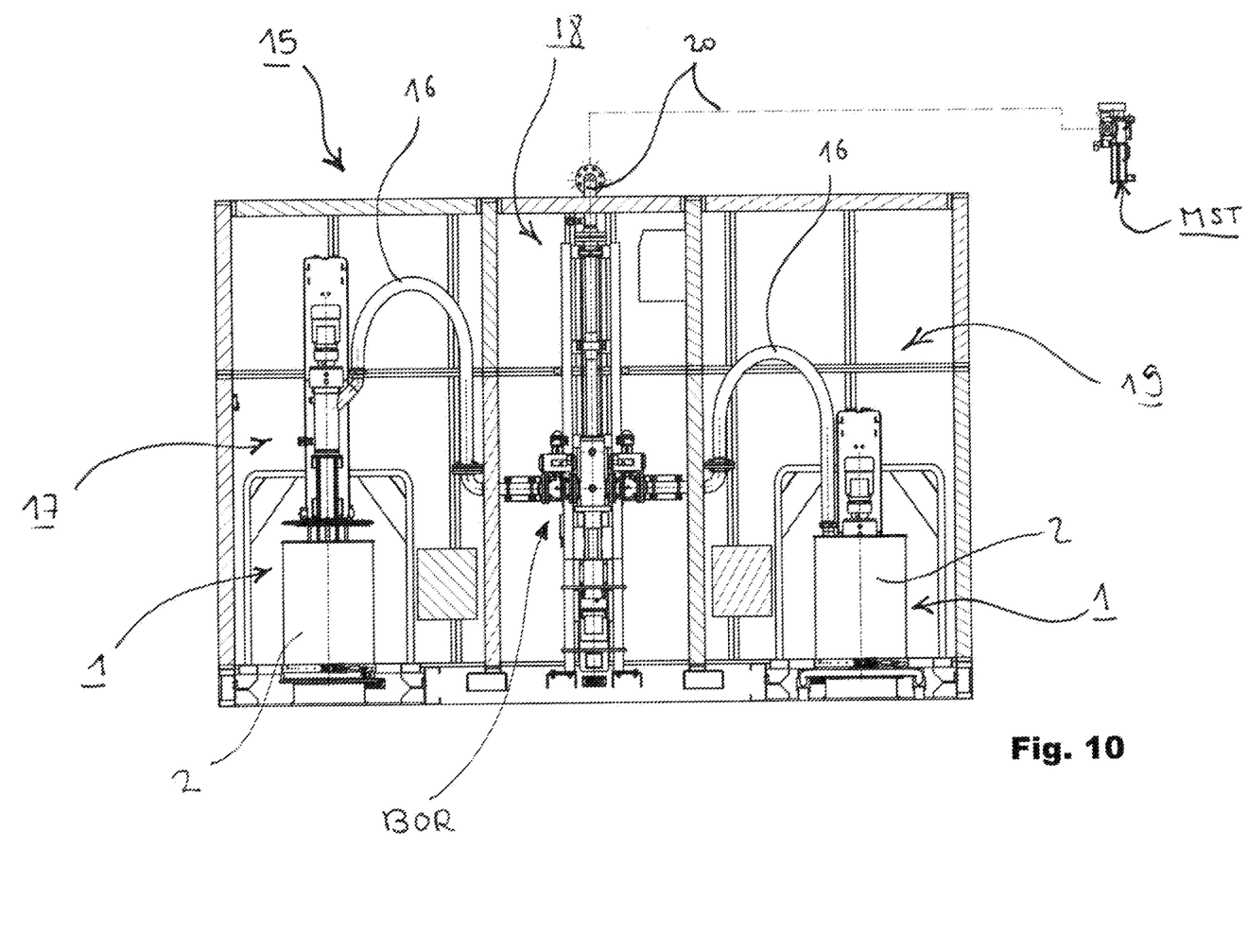
FIG. 10 shows a housing for the inventive emptying system or an overall system based on it, in vertical plane section.
Figure 11:
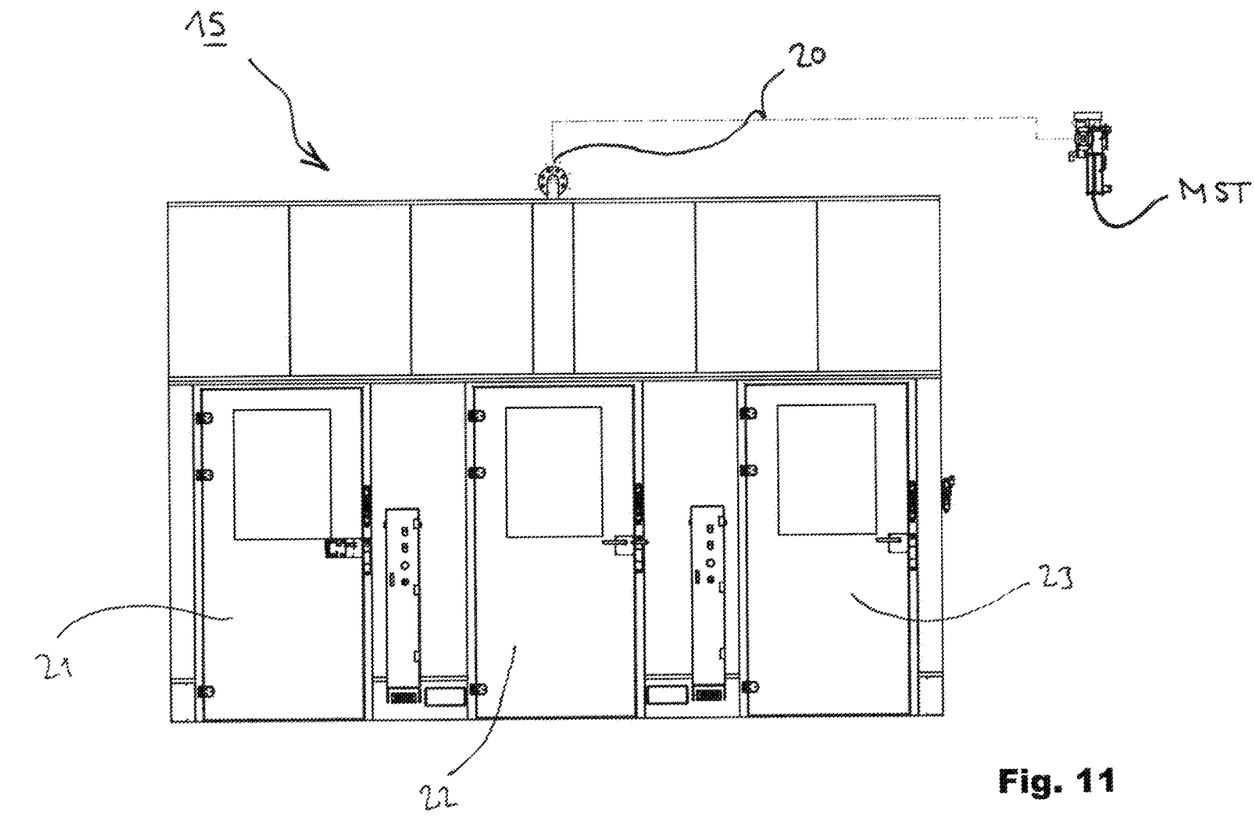
FIG. 11 shows a front view, from the front and outside, of the content of FIG. 10.

Such an installation with housing is shown in FIGS. 10 and 11. As can be seen, the housing defines at least two, better three, essentially mutually separated compartments 17, 18, 19. Preferably each of these compartments is heated, primarily with controlled or regulated heating, to a temperature above the surrounding temperature or to a temperature which, considered in its own right, does not yet allow pumping out in most cases, but does facilitate it more than insignificantly. Two compartments 17, 18 each contain one emptying system 1 in the inventive configuration, preferably complete.

Ideally, alternating operation is employed.

In the case illustrated here, the emptying system 1 shown at the right runs straight; that is, it pumps out the contents of the barrel-type container 2 associated with it. Thereupon it surrenders the contents outward, preferably by way of a U-shaped connector hose 16, preferably to a booster pump BOR that will be explained in detail presently. The mass is passed along by the booster pump by way of a feeder line 20, e.g., to the mouthpiece MST or a type of applicator gun, by either of which the mass emptied from the barrel-type container in situ is carried to its intended application site.

In the case illustrated here, the compartment at the left shows an additional empty system, which is preferably identical. It is immediately refilled by insertion of a fresh or additional barrel-type container 2. As soon as the barrel-type container 2 of the system in the right-hand compartment is exhausted, it is moved further (completely or, in any case, essentially) without an intermediate step from the system's barrel-type container 2 in the left-hand compartment 17, preferably in such a way that the mass in the feeder line 20 behind the booster pump is continuously kept in motion, which, among other things, helps to avoid re-feeding processes leading to difficulties from a mass brought to a standstill in the conduit line behind the booster pump.

Compartments 17 and 19 with the systems each comprise preferably at least one storage space (not illustrated) where an additional barrel-type container 2 is already stored and thus can be tempered long enough while the system pumps out material from another barrel-type container.

Because of the compartments which are thermally isolated from one another and preferably each directly accessible from outside by its own door 21, 22, 23 or flap, the respective emptying system can be reloaded and/or serviced without any risk of temporary cooling. The door or flap preferably should have a glass inspection opening through which the interior of the compartment can be monitored without the need to open the door or flap; see also FIG. 11.

It is ideal if at least the emptying system compartments are constructed in such a way that it is possible for work to be done inside them even with the door or flap shut. This is useful also in order to prevent cooling off as much as possible with respect to the compartment which is affected by the momentary replacement or maintenance work, since such cooling could adversely affect restarting or mobile readiness.

Once the mass to be moved has been drawn in by one or both of the inventive emptying systems and set in motion by reduction of its viscosity, then it becomes possible for a booster pump to contribute toward moving the mass to its usage site by way of a longer tube and/or hose connection. For this purpose, the compartment that, as a rule, completely contains the booster pump is preferably also tempered and ideally thermally separated from the other compartments.

Starting from the booster pump, the pumped mass is preferably removed by way of the roof of the housing because it is favorable for the uniformity of the mass output at the mouthpiece if the mass can be fed to it at the pipeline end in a downdraft.

In addition, it is provided the use of the emptying system, as described above, for emptying a barrel or container which contains modelling compound intended to duplicate a vehicle bodywork that is undergoing development, preferably at least a scale of 1:3, ideally—at least essentially or completely—in a ratio of 1:1.

Ideally, the aforementioned modeling compound is a modeling mass on the basis of at least one wax and preferably contains filler material and/or color pigments.

Often, or even as a rule, the aforementioned modeling compound should be produced in such a way that—at temperatures below the temperature at which it starts to change and/or to decompose disadvantageously and/or threatens to be flammable—it is not sufficiently viscous in an immobile state to be pumpable.

Often, or even as a rule, the aforementioned modeling compound has an (airless) density of 0.8 g/cm3 to 1.2 g/cm3 and/or a processing temperature of 45° C. to 65° C. and/or at 20° C. a Shore hardness A of 65 to 80.

The inventive agitation is preferably arranged in such a way that the mass or modeling compound to be emptied from the container can be pumped for a distance of more than 6 m or at least more than 4 m, after the agitation in the container—preferably without the need of additional agitation of this kind at a follow-up site. Ideally, it can be pumped still further or in any case for the distance from the container to the tube- or hose-fed dispenser or mouthpiece by which the user issues the modeling compound to the usage site, or primarily onto the model body that is in the process of being made.

In some cases, relay stations can be used to manage greater distances. Possibilities include stations in which the mass is placed in a puffer container or puffer storage unit, where it is again subjected to an inventive agitation and then can be pumped further once again.

To improve the pumpability or to make it more consistent, it can be useful to place the barrel-type container entirely inside a heated housing, along with its contents, the frame holding it and where possible also the turntable on which it stands, in any case including the screw spindle pump to be removed from it—and in many cases to do so even several hours before the pumping begins.

It is also provided the following emptying system which includes one or more of the previously described features:

an emptying system 1 for emptying paste-like material from preferably barrel-type containers 2 with a container follower plate 3—preferably capable of being lowered like a plunger into the container interior—and which comprises a removal opening 4 with a pump 5, which is in operative connection with the removal opening 4, for removing material enclosed in the collection chamber 6 between the container bottom and the container follower plate, distinguished in that at least one means—preferably a vibrator, an oscillator, a shaker and/or an ultrasonic transducer—is provided, which, at least in the area of the removal opening, imposes on the material present in the collection chamber a motion that ideally includes a shearing motion or essentially constitutes one, so that its viscosity is reduced in the area of the removal opening.

What is claimed is:

1. An emptying system for emptying a pasty material from a container, the emptying system comprising:
   a container follower plate configured to be lowered into an interior of the container,
   a removal opening formed in the container follower plate,
   a pump that is in operative connection with the removal opening, the pump being configured to extract the material enclosed in a collection chamber defined between a container base of the container and the container follower plate,
   wherein at least one agitator is provided in the collection chamber, the agitator being configured to impose a motion relative to the container follower plate upon the material enclosed in the collection chamber.

2. The emptying system according to claim 1, wherein the at least one agitator is a shearing strip, and
   wherein the shearing strip is attached to a surface of the container follower plate facing the collection chamber and extends out from said surface into the collection chamber.

3. The emptying system according to claim 2, wherein the container follower plate is non-rotatable, and the emptying system includes a container carrier that is driven to rotate the container.

4. The emptying system according to claim 1, wherein the at least one agitator is a shearing strip,
   wherein the shearing strip is disposed on an operative extension of a rotor of the pump, the operative extension extending through the container follower plate into the collection chamber such that the shearing strip is arranged within the collection chamber, and
   wherein the container to be emptied is stationary.

5. The emptying system according to claim 4, wherein the operational extension is connected with the rotor by a reduction gear unit, so that the operational extension rotates at a speed that varies with respect to the rotor.

6. The emptying system according to claim 2, wherein the shearing strip comprises a crenellated crown that faces towards the container base.

7. The emptying system according to claim 2, wherein the at least one agitator comprises several shearing strips, each shearing strip having a crenellated crown, and
   wherein each of the shearing strips spirals outward from a position adjacent to the removal opening towards a perimeter of the container follower plate.

8. The emptying system according to claim 2, wherein a side of the shearing strip which is oriented in a rotation direction is curved concave.

9. The emptying system according to claim 2, wherein an end of the shearing strip is arranged at an area adjacent the removal opening and extends out tangentially relative to a perimeter of the removal opening.

10. The emptying system according to claim 1, wherein the container follower plate comprises at least one exhaust valve for removing an air cushion in the collection chamber.

11. The emptying system according to claim 1, wherein the container follower plate is conical-shaped so that the container follower plate tapers toward the removal opening, wherein a cone angle of the container follower plate is between 1° and 10°.

12. The emptying system according to claim 1, wherein an outer periphery of the container follower plate comprises a flat seal,
wherein upon lowering the container follower plate in a lowering direction within the container, the flat seal is diverted in a direction opposite the lowering direction;
wherein the flat seal a radial width B and an axial width D subject to the following: B<2×D.

13. The emptying system according to claim 1, wherein the container follower plate is attached to a hollow column that is configured to raise and lower the container follower plate in relation to the container, and
wherein an eccentric screw pump is arranged inside the hollow column to draw the material by suction through the removal opening.

14. A method for emptying a pasty material from a container comprising:
using an emptying system to pump and empty the pasty material from the container, the emptying system having:
a container follower plate configured to be lowered into an interior of the container,
a removal opening formed in the container lower plate,
a pump that is in operative connection with the removal opening, the pump being configured to extract the material enclosed in a collection chamber defined between a container base of the container and the container follower plate,
wherein at least one agitator is provided in the collection chamber, the agitator being configured to impose a motion relative to the container follower plate upon the material enclosed in the collection chamber,
wherein the material is preferably is warmed and then drawn by the agitator.

15. The emptying system according to claim 4, wherein the shearing strip comprises a crenellated crown that faces towards the container base.

16. The emptying system according to claim 4, wherein the at least one agitator comprises several shearing strips, each shearing strip having a crenellated crown, and
wherein each of the shearing strips spirals outward from a position adjacent to the removal opening towards a perimeter of the container follower plate.

17. The emptying system according to claim 4, wherein a side of the shearing strip which is oriented in a rotation direction is curved concave.

18. The emptying system according to claim 4, wherein an end of the shearing strip is arranged at an area adjacent the removal opening and extends out tangentially relative to a perimeter of the removal opening.

19. The emptying system according to claim 11, wherein the cone angle of the container follower plate is between 1° and 5°.

20. The emptying system according to claim 12, wherein the flat seal forms a lip seal.

* * * * *